(12) United States Patent
Wang et al.

(10) Patent No.: US 10,908,485 B2
(45) Date of Patent: Feb. 2, 2021

(54) OPTICAL ELEMENT ADJUSTING DEVICE AND ELECTRONIC DEVICE

(71) Applicant: Coretronic Corporation, Hsin-Chu (TW)

(72) Inventors: Chih-Hao Wang, Hsin-Chu (TW); Chia-Jun Chen, Hsin-Chu (TW)

(73) Assignee: Coretronic Corporation, Hsin-Chu (TW)

( * ) Notice: Subject to any disclaimer, the term of this patent is extended or adjusted under 35 U.S.C. 154(b) by 0 days.

(21) Appl. No.: 16/708,458

(22) Filed: Dec. 10, 2019

(65) Prior Publication Data

US 2020/0183262 A1   Jun. 11, 2020

(30) Foreign Application Priority Data

Dec. 11, 2018 (CN) .................... 2018 2 2075985 U (51) Int. Cl.
*G03B 21/14* (2006.01)
*G02B 7/02* (2021.01)

(52) U.S. Cl.
CPC .......... *G03B 21/142* (2013.01); *G02B 7/023* (2013.01)

(58) Field of Classification Search
CPC .... G03B 21/14; G03B 21/142; G03B 21/145; G03B 21/208; G03B 21/2013; G03B 21/2033; G03B 21/2053; H04N 9/312; H04N 9/3141; H04N 9/3152; H04N 9/3155; H04N 9/3164; G02B 27/12; G02B 27/023; G02B 27/30; G02B 27/425; G02B 27/0955
See application file for complete search history.

(56) References Cited

U.S. PATENT DOCUMENTS 9,075,294 B2 * 7/2015 Watanabe .............. G03B 21/30
2017/0026555 A1 * 1/2017 Hoyda ................... F16M 11/24

FOREIGN PATENT DOCUMENTS

CN        207424505 U        5/2018

* cited by examiner

*Primary Examiner* — Sultan Chowdhury (57) ABSTRACT

An optical element adjusting device includes an outer frame; an inner frame framing an optical element and disposed in the outer frame; a first adjusting structure, including a first adjusting part connected to one of two opposite outer sides of the inner frame, and movably disposed through the outer frame; and a second adjusting structure, including a through channel formed in the outer frame and having connected first and second sub-channels, a second adjusting part connected to the other outer side and movably disposed in the first sub-channel, an adjusting element movably disposed in the second sub-channel, and a rolling element disposed in the through channel and between the second adjusting part and the adjusting element. The position of the optical element can be adjusted by rotating the rolling element through the adjusting element. An electronic device including the optical element adjusting device is also provided.

17 Claims, 10 Drawing Sheets

FIG. 10

OPTICAL ELEMENT ADJUSTING DEVICE AND ELECTRONIC DEVICE

CROSS-REFERENCE TO RELATED APPLICATION

This application claims the priority benefit of China application serial no. 201822075985.0, filed on Dec. 11, 2018. The entirety of the above-mentioned patent application is hereby incorporated by reference herein and made a part of this specification.

FIELD OF THE INVENTION

The invention relates to an optical element adjusting device and an electronic device, and more particularly to an optical element adjusting device and an electronic device that can be used to adjust the position of the optical element.

BACKGROUND OF THE INVENTION

Light-emitting diodes (LEDs) have the advantages of small size, long service life and good heat dissipation, and have been widely used in various fields recently, such as projectors, display devices, etc. However, the brightness of the beam emitted by the LEDs is relatively uneven and has a larger divergence angle. Therefore, when the LEDs are used as a light source for illumination, projectors, or other devices, an optical lens is required to receive the maximum amount of beam, thereby avoiding the problem of low projected light intensity and uneven luminosity distribution of the projection surface.

Currently, when an optical lens is used in a projection device, the optical lens is fixed to the optical machine housing of the projection device by a fixing element, wherein the position of the optical lens needs to be finely adjusted in order to make the optical lens have better optical effects. Therefore, since the fixing element has been assembled on the housing, a convenient way to finely adjust the position of the optical lens of the optical machine is something that those skilled in the art highly desire for.

The information disclosed in this "BACKGROUND OF THE INVENTION" section is only for enhancement understanding of the background of the invention and therefore it may contain information that does not form the prior art that is already known to a person of ordinary skill in the art. Furthermore, the information disclosed in this "BACKGROUND OF THE INVENTION" section does not mean that one or more problems to be solved by one or more embodiments of the invention were acknowledged by a person of ordinary skill in the art.

SUMMARY OF THE INVENTION

The invention provides an optical element adjusting device and an electronic device, wherein the optical element adjusting device can finely adjust the position of the optical element easily and has the advantages of improving adjusting convenience and reducing processing time.

Other advantages and objects of the invention can be further understood from the technical features disclosed herein.

In order to achieve one or a portion of or all of the objects or other objects, an embodiment of the invention provides an optical element adjusting device for disposing an optical element. The optical element adjusting device includes an outer frame, an inner frame, a first adjusting structure and a second adjusting structure. The outer frame has a framed space. The inner frame is provided for framing an optical element. The inner frame is disposed in the framed space. The inner frame includes a first outer side surface and a second outer side surface opposite to each other. The first adjusting structure includes a first adjusting part. The first adjusting part is connected to first outer side surface of the inner frame. At least a portion of the first adjusting part is movably disposed through the outer frame. The second adjusting structure includes a through channel formed in the outer frame, a second adjusting part, at least one rolling element and an adjusting element. The through channel includes a first sub-channel and a second sub-channel communicated with each other. The second adjusting part is connected to the second outer side surface of the inner frame. At least a portion of the second adjusting part is movably disposed through the first sub-channel. At least a portion of the adjusting element is movably disposed through the second sub-channel. The rolling element is disposed in the through channel and between the second adjusting part and the adjusting element.

In order to achieve one or a portion of or all of the objects or other objects, an embodiment of the invention provides an electronic device with a light source device for generating a beam. The electronic device includes at least one optical element and at least one optical element adjusting device. The at least one optical element adjusting device is for respectively disposing the at least one optical element. The at least one optical element is disposed on a transmission path of the beam.

Based on the above, embodiments of the invention have at least one of the following advantages or effects. In the invention, the adjusting element screws into or screws out of the second sub-channel to drive the rolling element to roll, so that the inner frame is transversely moved in the framed space of the outer frame, thereby finely adjusting the position of the optical element framed by the inner frame, then the desired position of the optical element allows a better optical effect when the beam illuminates the optical element. As such, the embodiments have the advantage of improving adjusting convenience and reducing processing time.

Other objectives, features and advantages of The invention will be further understood from the further technological features disclosed by the embodiments of The invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DETAILED DESCRIPTION OF PREFERRED EMBODIMENTS

In the following detailed description of the preferred embodiments, reference is made to the accompanying drawings which form a part hereof, and in which is shown by way of illustration specific embodiments in which the invention may be practiced. In this regard, directional terminology, such as "top", "bottom", "front", "back", etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including", "comprising", or "having" and variations thereof herein is meant to encompass the items listed thereafter and equivalents thereof as well as additional items. Unless limited otherwise, the terms "connected", "coupled", and "mounted" and variations thereof herein are used broadly and encompass direct and indirect connections, couplings, and mountings. Similarly, the terms "facing", "faces", and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component facing "B" component directly or one or more additional components is between "A" component and "B" component. Also, the description of "A" component "adjacent to" "B" component herein may contain the situations that "A" component is directly "adjacent to" "B" component or one or more additional components is between "A" component and "B" component. Accordingly, the drawings and descriptions will be regarded as illustrative in nature and not as restrictive.

Figure 1:
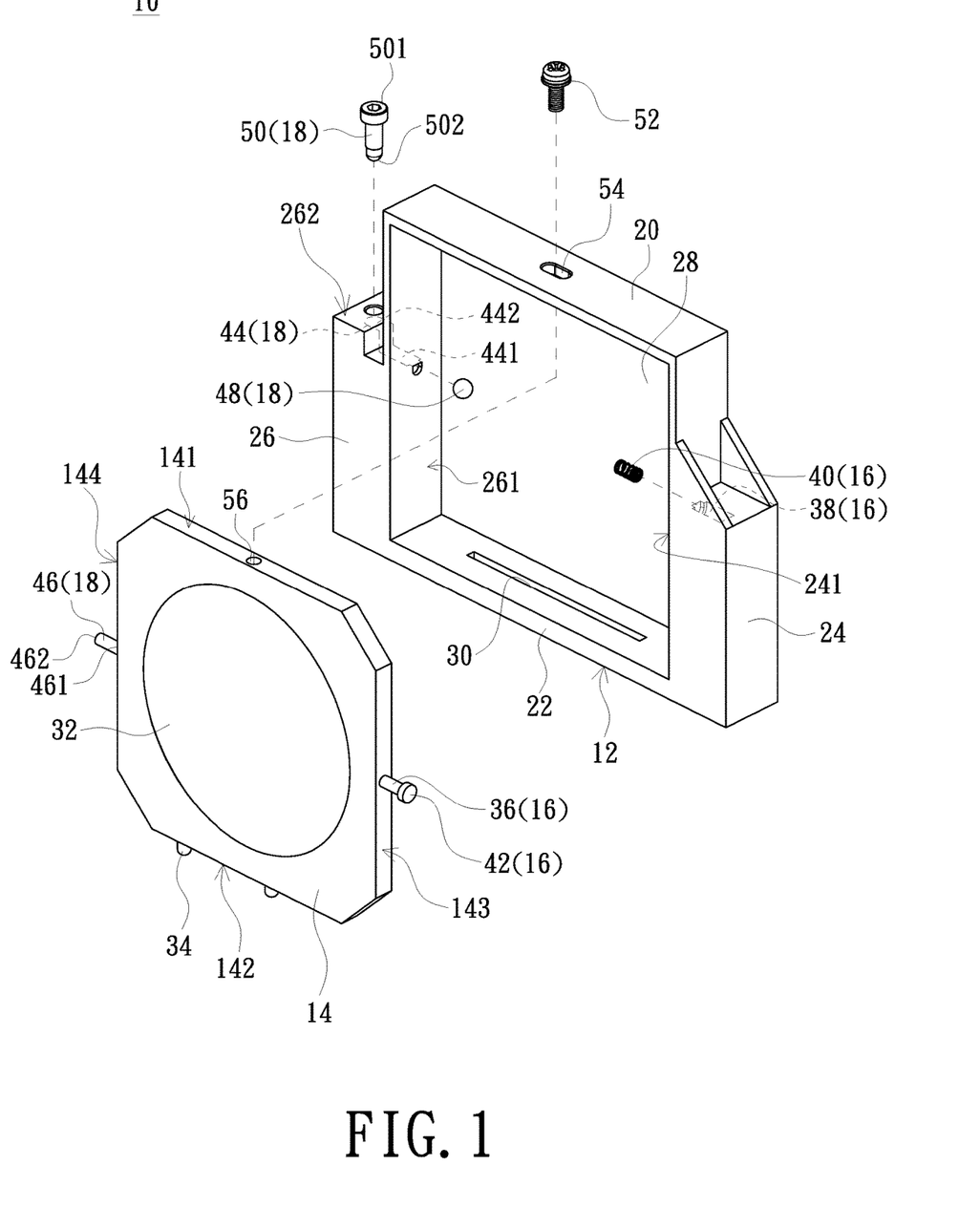
FIG. 1 is a schematic exploded view of an optical element adjusting device according to an embodiment of the invention.
Figure 2:
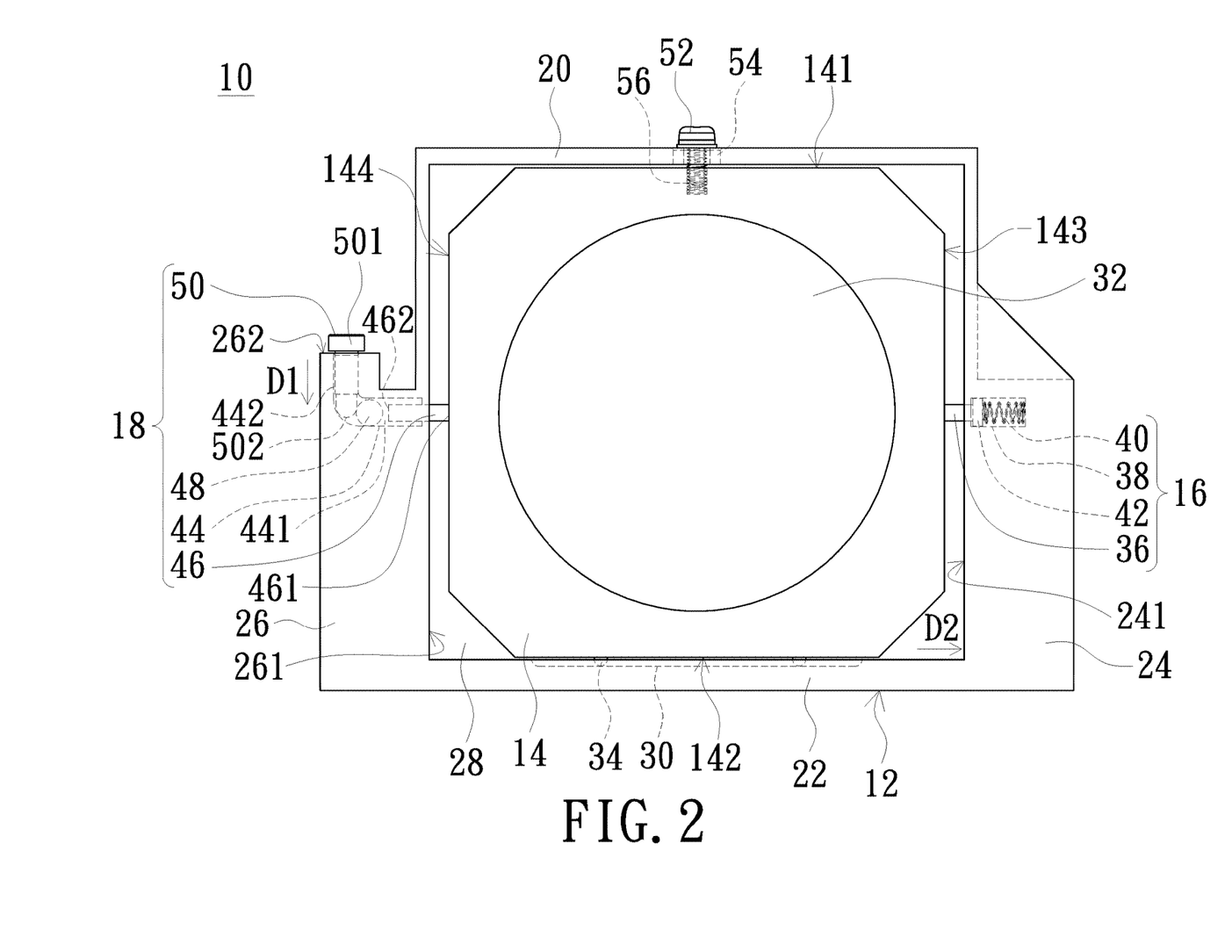
FIG. 2 is a schematic front view of an optical element adjusting device according to an embodiment of the invention.

FIG. 1 is a schematic exploded view of an optical element adjusting device according to an embodiment of the invention. FIG. 2 is a schematic front view of an optical element adjusting device according to an embodiment of the invention. As shown in FIG. 1 and FIG. 2, the optical element adjusting device 10 includes an outer frame 12, an inner frame 14, a first adjusting structure 16, and a second adjusting structure 18. The outer frame 12 includes a top frame side 20, a bottom frame side 22 and two opposite outer frame sides. The two opposite outer frame sides are connected to the top frame side 20 and the bottom frame side 22 to enclose a frame space 28. The two opposite outer frame sides are respectively a first outer frame side 24 and a second outer frame side 26. The first outer frame side 24 has a first inner surface 241, and the second outer frame side 26 has a second inner surface 261. The second outer frame side 26 further has a top surface 262. The top surface 262 is non-parallel to the second inner surface 261. In an embodiment, the top surface 262 is, for example, perpendicular to the second inner surface 261. Further, a positioning groove 30 is formed on a surface of the bottom frame side 22 facing the top frame side 20, and the positioning groove 30 is, for example, a long groove.

The inner frame 14 is provided for framing an optical element 32, and the optical element 32 is, for example, a condenser lens. The inner frame 14 has a substantially square shape and includes an upper surface 141, a bottom surface 142, and two opposite outer side surfaces. The two opposite outer side surfaces are connected to the upper surface 141 and the bottom surface 142. The two opposite outer side surfaces are respectively a first outer side surface 143 and a second outer side surface 144. In an embodiment, two raised portions 34 are formed on the bottom surface 142 of the inner frame 14. As shown in FIG. 2, the two raised portion 34 insert into the positioning groove 30, so that the inner frame 14 is received in the framed space 28. Further, the first outer side surface 143 is opposite to the first inner surface 241 of the outer frame 12, and the second outer side surface 144 is opposite to the second inner surface 261 of the outer frame 12.

Figure 3:
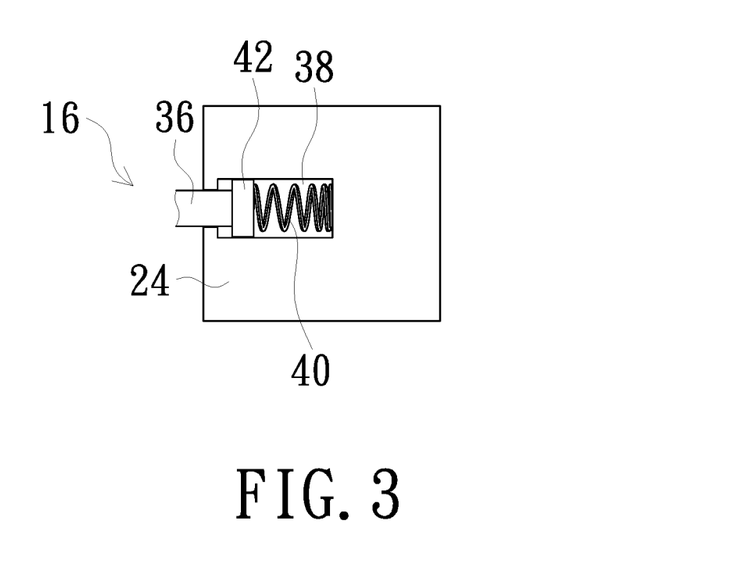
FIG. 3 is a schematic view of a first adjusting structure of an optical element adjusting device according to an embodiment of the invention.

Please also refer to FIG. 3. The first adjusting structure 16 includes a first adjusting part 36. The first adjusting part 36 is, for example, a cylindrical rod. One end of the first adjusting part 36 is connected to the first outer side surface 143 of the inner frame 14, and the other end and most of the first adjusting part 36 are movably disposed through the first outer frame side 24 of the outer frame 12. In an embodiment, the first adjusting structure 16 further includes a containing recess 38 formed on the first outer frame side 24 of the outer frame 12, an elastic element 40, and a blocking part 42. As shown in FIG. 2, the elastic element 40 is, for example, a spring. The elastic element 40 is disposed in the containing recess 38. The first adjusting part 36 is disposed through the first outer frame side 24, and an end of the first adjusting part 36 disposed through the outer frame 12 is inserted into the containing recess 38, so that the first adjusting part 36 is disposed between the first outer side surface 143 of the inner frame 14 and the elastic element 40. Further, the blocking part 42 is disposed at the end of the first adjusting part 36 inserted into the containing recess 38. Specifically, the blocking part 42 is also a cylindrical rod. The cross-sectional dimension of the blocking part 42 is larger than the cross-sectional dimension of the first adjusting part 36, and one end of the blocking part 42 is connected to the first adjusting part 36, and the other end is abutted against or adjacent to the elastic element 40.

Figure 4:
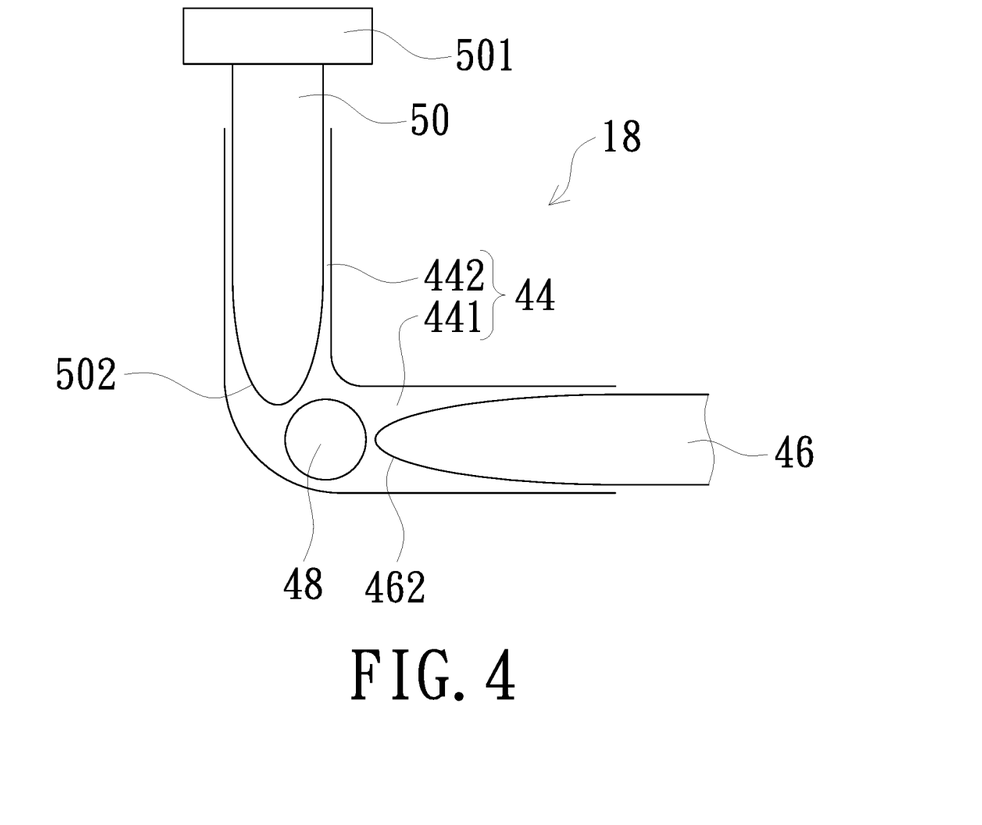
FIG. 4 is a schematic diagram of a second adjusting structure of an optical element adjusting device according to an embodiment of the invention.

Please also refer to FIG. 4. The second adjusting structure 18 includes a through channel 44 formed in the second outer frame side 26 of the outer frame 12, a second adjusting part 46, at least one rolling element 48, and an adjusting element 50. The through channel 44 includes a first sub-channel 441 and a second sub-channel 442 communicated with each other. In an embodiment, the communicated first sub-channel 441 and the second sub-channel 442 are bent in substantially L-shaped, wherein the first sub-channel 441 transversely passes through the second inner surface 261 of the second outer frame side 26, and the second sub-channel 442 longitudinally passes through the top surface 262 of the second outer frame side 26. The second adjusting part 46 is, for example, a cylindrical rod having a connecting ends 461 and a contacting end 462 opposite to each other. The connecting end 461 is connected to the second outer side surface 144 of the inner frame 12, and the contacting end 462 and most of the second adjusting part 46 are movably disposed through the first sub-channel 441. The adjusting element 50 is, for example, an adjusting screw, and has an adjusting end 501 and a pushing end 502 opposite to each other. In an embodiment, the adjusting end 501 has a flat cylindrical shape, and the cross-sectional dimension of the adjusting end 501 is larger than the cross-sectional dimension of the second sub-channel 442. Most of the adjusting element 50 is movably disposed through the second sub-channel 442, and the adjusting end 501 is exposed from the second sub-channel 442. The rolling element 48 is, for example, a steel ball, and the rolling element 48 is received in the through channel 44 and disposed between the second adjusting part 46 and the adjusting element 50. Specifically, the rolling element 48 is mainly located at a bend of the L-shaped through channel 44, and the contacting end 462 of the second adjusting part 46 and the pushing end 502 of the adjusting element 50 contact the rolling element 48.

As shown in FIG. 2, when rotating the adjusting element 50 through the adjusting end 501 so that the adjusting element 50 screws into the second sub-channel 442, the adjusting element 50 is gradually moved in a first direction D1. The first direction D1 is, for example, a direction in which the top frame side 20 faces the bottom frame side 22. That is, the adjusting element 50 is longitudinally moved downward in the second sub-channel 442, and accordingly the pushing end 502 of the adjusting element 50 pushes the contacted rolling element 48, so that the rolling element 48 rolls. The pushing end 502 of the adjusting element 50 further pushes the second adjusting part 46 to be moved in a second direction D2 in the sub-channel 441. The second direction D2 is, for example, a direction in which the second outer frame side 26 faces the first outer frame side 24. That is, the pushing end 502 of the adjusting element 50 pushes the second adjusting part 46 and the inner frame 14 connected to the second adjusting part 46 toward the first outer frame side 24 of the outer frame 12. Thus, the first outer side surface 143 of the inner frame 14 gradually approaches the first outer frame side 24, and the first adjusting part 36 connected to the first outer side surface 143 moves in the second direction D2 toward the elastic element 40, thereby causing the blocking part 42 to compress the elastic element 40. Moreover, when rotating the adjusting element 50 through the adjusting end 501 so that the adjusting element 50 screws out the second sub-channel 442, the compressed elastic element 40 is extended to generate a pressure to push the blocking part 42, the first adjusting part 36 connected to the blocking part 42, and the inner frame 14 connected to the first adjusting part 36 to move in a direction opposite to the second direction D2, that is, to move toward the second outer frame side 26 of the outer frame 12. As such, the contacting end 462 of the second adjusting part 46 pushes and moves the rolling element 48 until the rolling element 48 is blocked by the pushing end 502 of the adjusting element 50.

In other words, by screwing the adjusting element 50 into or out of the second sub-channel 442, the inner frame 14 is moved to have a displacement in the second direction D2 or in the opposite direction of the second direction D2 between the first outer frame side 24 and the second outer frame side 26 of the outer frame 12, so as to finely adjust the positions of the inner frame 14 and the optical element 32 framed by the inner frame 14. As such, the desired position of the optical element 32 has a better optical effect, such as a better light converging effect, when the beam illuminates the optical element 32.

Further, as shown in FIG. 1 and FIG. 2, the optical element adjusting device 10 further includes at least one fixing element 52. The fixing element 52 is, for example, a fixing screw, and the number of the fixing element 52 is, for example, one. Further, an opening 54 is formed at a middle position of the top frame side 20 of the outer frame 12, and the opening 54 is, for example, a long opening extending toward the first outer frame side 24 and the second outer frame side 26. A fixing recess 56 is formed at a middle position of the upper surface 141 of the inner frame 14, and the fixing recess 56 is, for example, a screw recess. The size of the opening 54 is larger than the size of the fixing recess 56. In an embodiment, the radial length of the opening 54 extending toward the first outer frame side 24 and the second outer frame side 26 is greater than the radial length of the fixing recess 56. When the inner frame 14 is received in the framed space 28 of the outer frame 12 and the optical element 32 is finely adjusted in the desired position, the fixing element 52 is disposed through the opening 54 and fixed in the fixing recess 56 to fix the inner frame 14 in the framed space 28. Since the size of the opening 54 is larger than the size of the fixing recess 56, the fixing recess 56 can still correspond to the opening 54 when the inner frame 14 is finely adjusted in the framed space 28, so that the fixing element 52 can be disposed through the opening 54 to be fixed to the fixing recess 56.

In an embodiment, after the fixing element 52 has fix the inner frame 14 together with the optical element 32 to the framed space 28 of the outer frame 12, a harden glue (not shown) can be used for dispensing at the exposed parts of the fixing element 52 and the adjusting element 50, so as to ensure that the fixing element 52 and the adjusting element 50 are not loosened and the position of the optical element 32 does not change when the optical element 32 is in use. The harden glue can be UV glue, green glue or screw glue that can fix the fixing element 52 and the adjusting element 50.

Figure 5A:
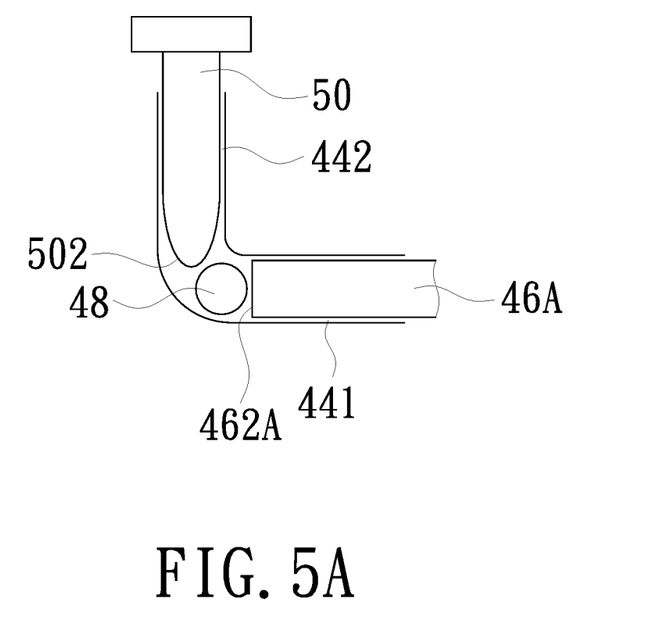
FIG. 5A to FIG. 5D are schematic diagrams of second adjusting structures in which the contacting ends have different end surfaces respectively according to another embodiment of the invention.
Figure 5B:
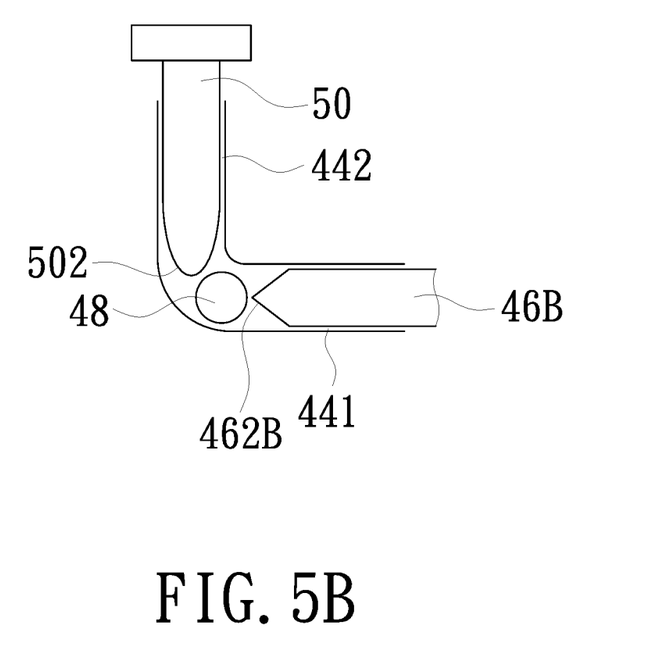
Figure 5C:
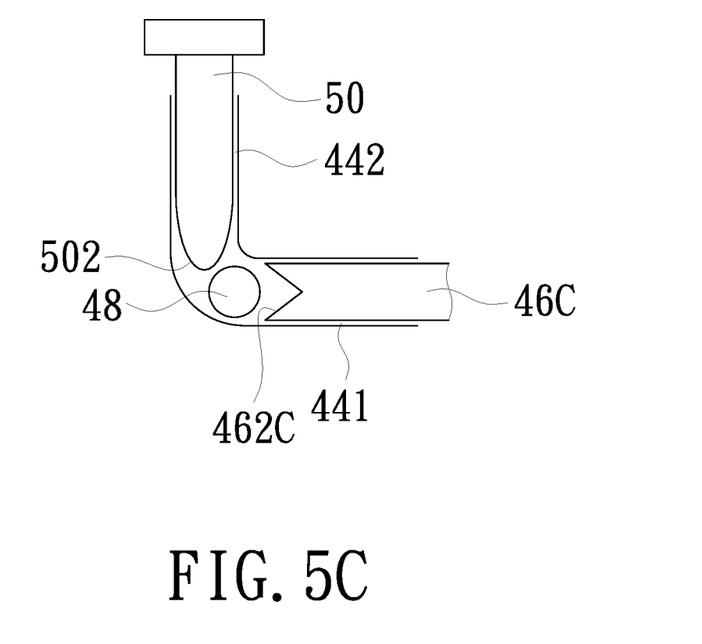
Figure 5D:
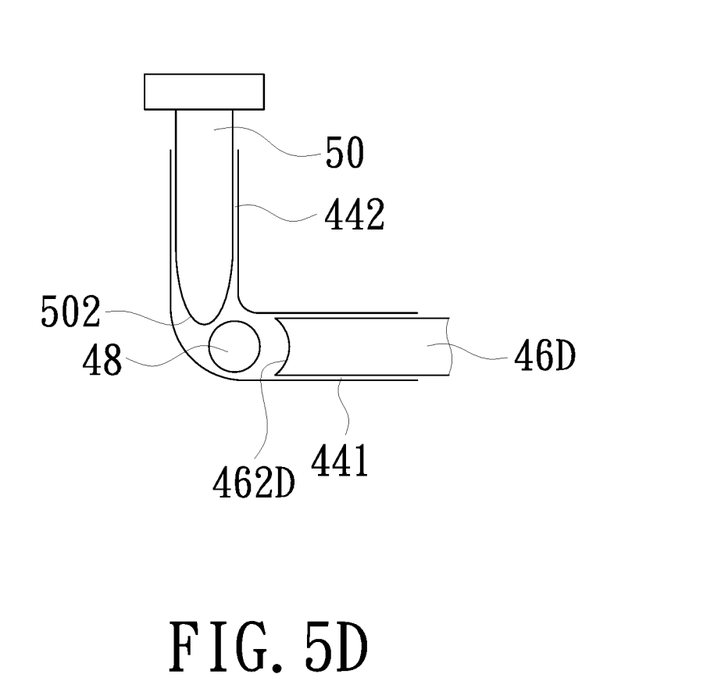

On the other hand, in the second adjusting structure 18 shown in FIG. 4, the end surface of the second adjusting part 46 for contacting the contacting end 462 of the rolling element 48 is a convex cambered surface, and the most convex part of the convex cambered surface is used for abutting against the rolling element 48. The contacting end 461 can further have other different end surfaces in addition to the convex cambered surface. FIG. 5A to FIG. 5D are schematic diagrams of second adjusting structures in which the contacting ends have different end surfaces respectively according to another embodiment of the invention. As shown in FIG. 5A, the end surface of the contacting end 462A of the second adjusting part 46A is a flat surface, and part of the flat surface is used for abutting against the rolling element 48. As shown in FIG. 5B, the end surface of the contacting end 462B of the second adjusting part 46B is a sharp end, and the sharp end is used for abutting against the rolling element 48. As shown in FIG. 5C, the end surface of the contacting end 462C of the second adjusting part 46C is a concave angular surface, and part of the concave angular surface is used for abutting against the rolling element 48. As shown in FIG. 5D, the end surface of the contacting end 462D of the second adjusting part 46D is a concave cambered surface, and part or entire of the concave cambered surface is used for abutting against the rolling element 48.

Figure 6A:
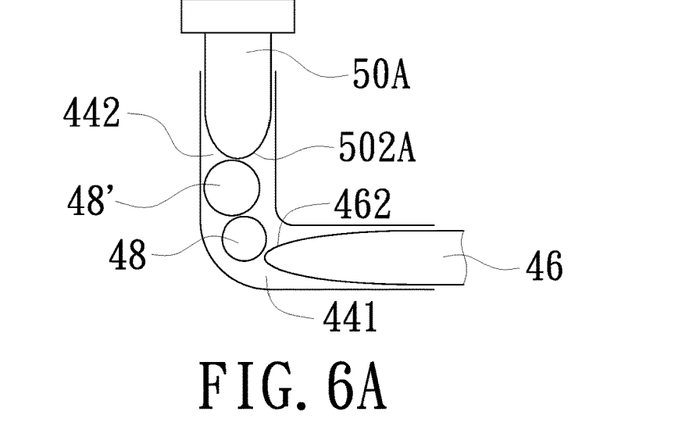
FIG. 6A to FIG. 6C are schematic diagrams of second adjusting structures in which the pushing ends have different end surfaces respectively and the rolling elements are plural according to another embodiment of the invention.
Figure 6B:
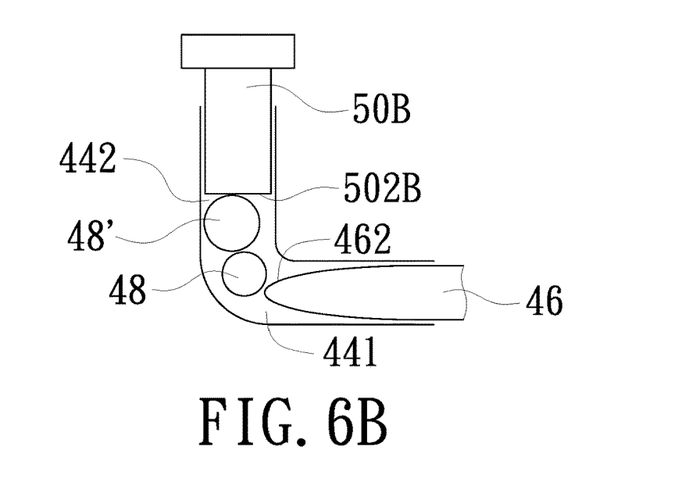
Figure 6C:
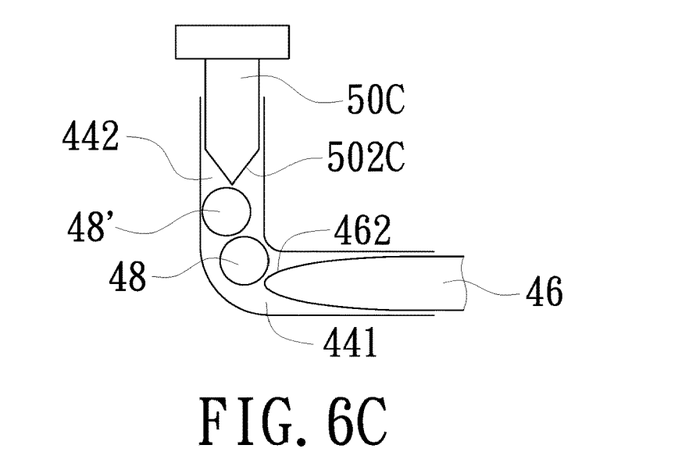

In the embodiments shown in FIG. 4 and FIG. 5A to FIG. 5D, the end surface of the pushing end 502 of the adjusting element 50 is, for example, a convex cambered surface, and the number of the rolling element 48 is, for example, one, and the cross-sectional dimension of the first sub-channel 441 is substantially the same as the cross-sectional dimension of the second sub-channel 442, but not limited thereto. FIG. 6A to FIG. 6C are schematic diagrams of second adjusting structures in which the pushing ends have different end surfaces respectively and the numbers of the rolling elements are plural according to another embodiment of the invention. As shown in FIG. 6A, the end surface of the pushing end 502A of the adjusting element 50A is a convex cambered surface; as shown in FIG. 6B, the end surface of the pushing end 502B of the adjusting element 50B is a flat surface; as shown in FIG. 6C, the end surface of the pushing end 502C of the adjusting element 50C is a sharp end; however, the invention is not limited thereto. In other embodiments not shown, the end surface of the pushing end 502 can also be a concave angular surface or a concave cambered surface.

Following the above description, the cross-sectional dimension of the first sub-channel 441 of the through channel 44 and the cross-sectional dimension of the second sub-channel 442 can be substantially the same or different, and correspondingly, the cross-sectional dimension of the second adjusting part 46 and the cross-sectional dimension of the adjusting element 50 can also be substantially the same or different. In FIG. 6A and FIG. 6B, the cross-sectional dimension of the second sub-channel 442 is larger than the cross-sectional dimension of the first sub-channel 441, and the cross-sectional dimension of the adjusting element 50A is larger than the cross-sectional dimension of the second adjusting part 46; in FIG. 6C, the cross-sectional dimension of the second sub-channel 442 is substantially the same as the cross-sectional dimension of the first sub-channel 441, and the cross-sectional dimension of the adjusting element 50C is substantially the same as the cross-sectional dimension of the second adjusting part 46; but not limited thereto. The cross-sectional dimension of the second sub-channel 442 can also be smaller than the cross-sectional dimension of the first sub-channel 441, and correspondingly the cross-sectional dimension of the adjusting element 50 may be smaller than the cross-sectional dimension of the second adjusting part 46.

Further, depending on the adjusting of the adjusting element 50, a plurality of rolling elements 48 and 48' having the same or different sizes may be used. In the embodiments shown in FIG. 6A to FIG. 6C, the number of the rolling elements 48 and 48' is, for example, two. Specifically, as shown in FIG. 6A and FIG. 6B, the rolling element 48' that contacted by the pushing end 502A/502B of the adjusting element 50A/50B has the size larger than the size of the other rolling element 48 that contacted by the contacting end 462 of the second adjusting part 46; and as shown in FIG. 6C, the sizes of the rolling elements 48 and 48' are substantially the same.

Figure 7:
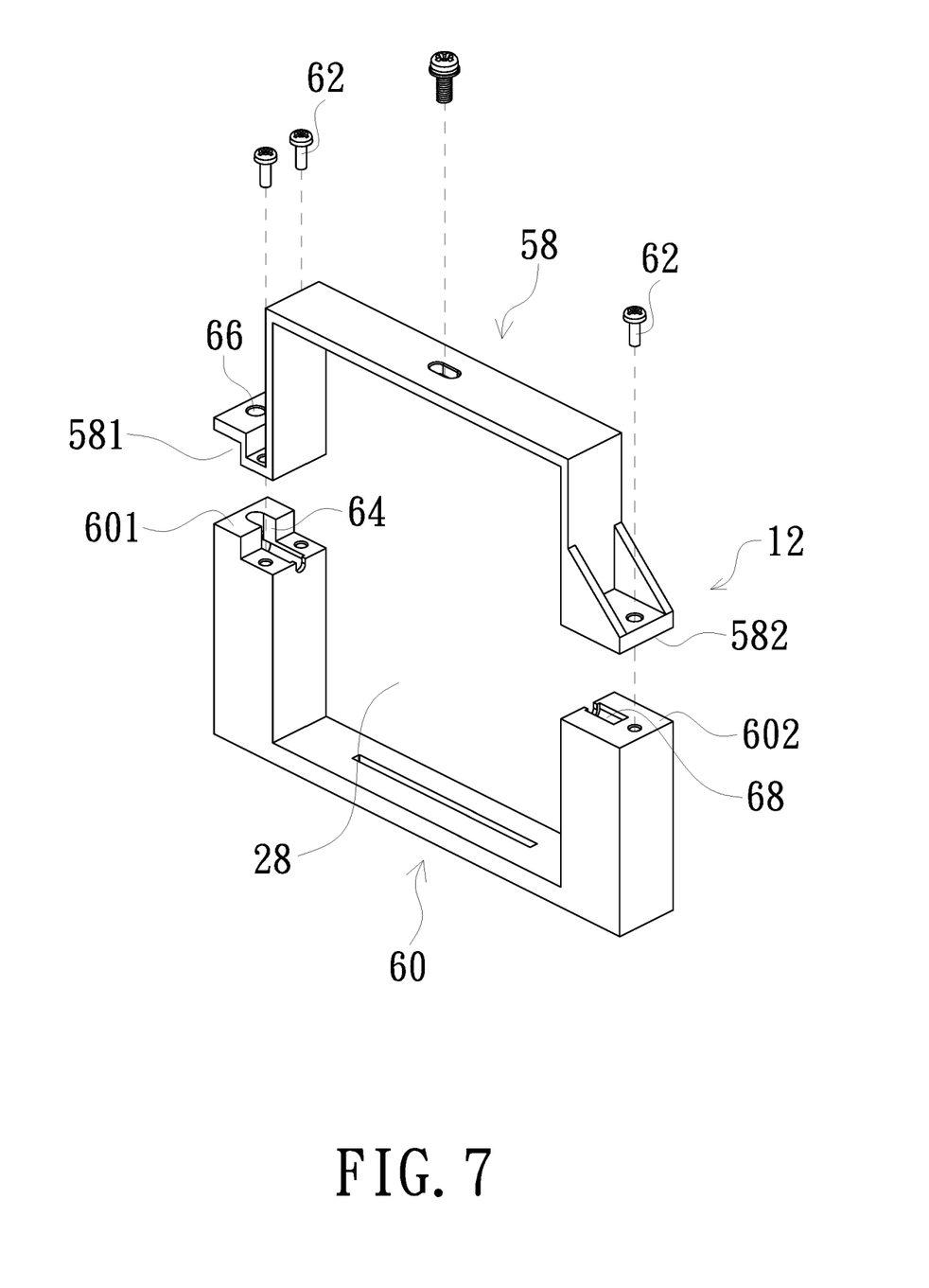
FIG. 7 is a schematic exploded view of an outer frame according to an embodiment of the invention.
Figure 8:
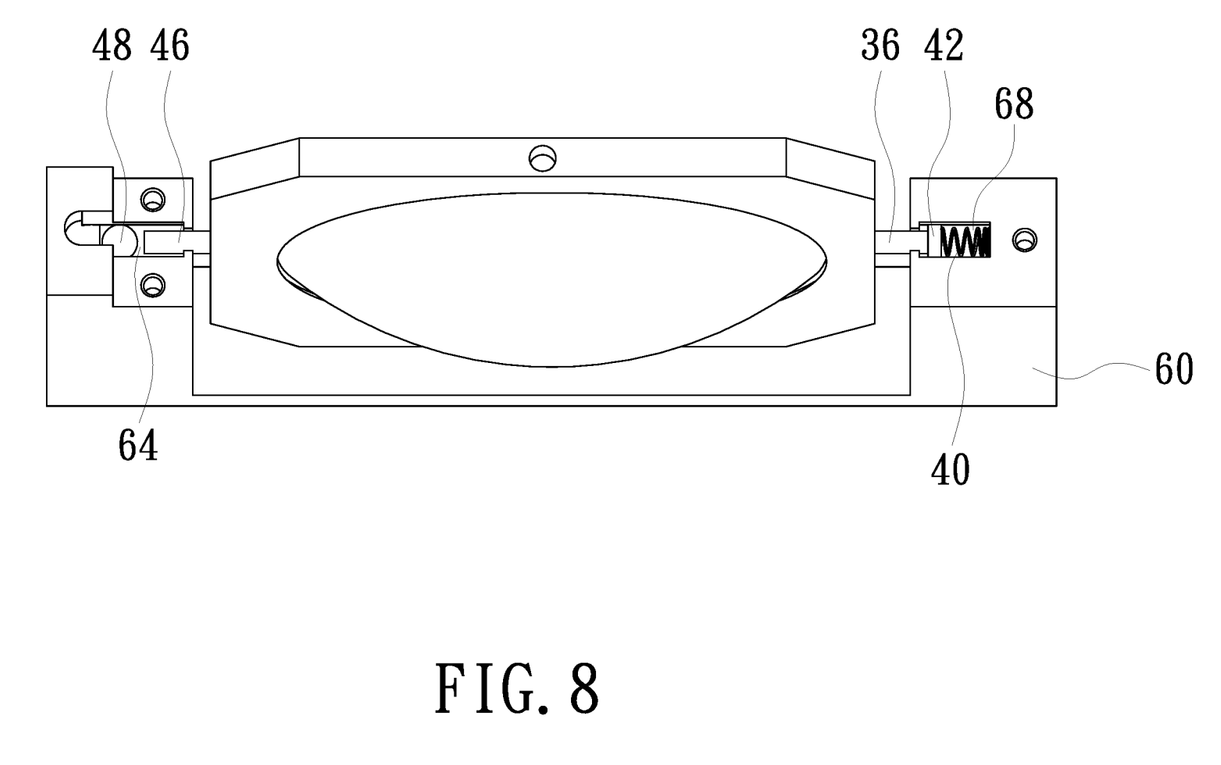
FIG. 8 is a schematic partial assembled view of an optical element adjusting device according to an embodiment of the invention.

In the embodiment of the invention, the outer frame 12 may be integrally formed or assembled from two frame parts. FIG. 7 is a schematic exploded view of an outer frame according to an embodiment of the invention. As shown in FIG. 7, the outer frame 12 includes a first frame part 58 and a second frame part 60. The first frame part 58 and the second frame part 60 can be butted together and fixed by a plurality of screws 62 for constructing the framed space 28. In an embodiment, the first frame part 58 is substantially an inverted U-shaped structure and has a first butting end 581 and a second butting end 582. The second frame part 60 is substantially a U-shaped structure and has a third butting end 601 and a fourth butting end 602. The first butting end 581 and the third butting end 601 are substantially step-shaped and can be butted and fixed together. A substantially L-shaped bended concave part 64 is formed at one of the first butting end 581 and the third butting end 601. For example, as shown in FIG. 7, the bended concave part 64 is formed at the third butting end 601. A through hole 66 is formed in the first butting end 581 and corresponds to the longitudinal section of the bended concave part 64. The through hole 66 can be, for example, a screw hole. The second butting end 582 and the fourth butting end 602 are substantially flat surface and can be butted and fixed together. A containing concave part 68 is formed at one of the second butting end 582 and the fourth butting end 602. For example, as shown in FIG. 7, the containing concave part 68 is formed at the fourth butting end 602. In an embodiment, FIG. 8 is a schematic partial assembled view of an optical element adjusting device according to an embodiment of the invention. Please also refer to FIG. 7. Before the first frame part 58 and the second frame part 60 are butted together, first, the rolling element 48 and the elastic element 40 are respectively placed in the bended concave part 64 and the containing concave part 68, a part of the second adjusting part 46 is placed in the bended concave part 64, and a part of the first adjusting part 36 and the blocking part 42 are placed in the containing concave part 68. And then, the first frame part 58 (shown in FIG. 7) and the second frame part 60 are butted together. Thus, the bended concave part 64 and the through hole 66 (shown in FIG. 7) are constructed as the through channel 44 as shown in FIG. 1 and FIG. 2, and the containing concave part 68 serves as the containing recess 38 as shown in FIG. 1 and FIG. 2.

Figure 9:
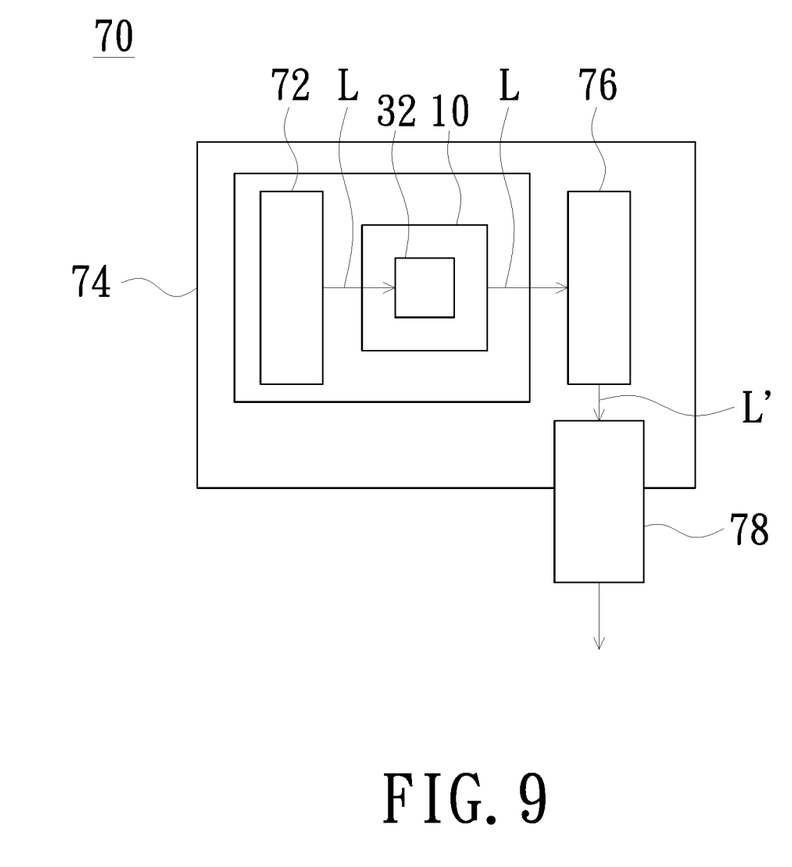
FIG. 9 is a schematic block diagram of an electronic device according to an embodiment of the invention.

FIG. 9 is a schematic block diagram of an electronic device according to an embodiment of the invention. Please refer to FIG. 9. The electronic device 70 is, for example, a projector or other electronic device provided with a condenser lens. The electronic device 70 includes a light source device 72, an optical element 32, and an optical element adjusting device 10. The light source device 72 is for generating a beam L. The optical element adjusting device 10 is for arranging an optical element 32, and the optical element 32 is disposed on the transmission path of the beam L. The detailed features of the optical element adjusting device 10 have been described in the above embodiments, and no redundant detail is to be given herein, wherein the optical element 32 is framed by the inner frame 14 (shown in FIG. 1 and FIG. 2) of the optical element adjusting device 10.

The light source device 72 may include a light bulb (such as a halogen bulb, a high pressure mercury lamp, etc.), and the generated beam may be white light. The light source device 72 may also include a light emitting diode (LED) light source, and the generated beam may be composed of red light, blue light, and green light. The light source device 72 may also include a laser light source, and the generated beam may be blue light. Further, the light source device 72 can also be other kinds of light sources.

In an embodiment, if the electronic device 70 is a projector as shown in FIG. 9, the electronic device 70 includes an illumination system 74, a light valve 76, and a projection lens 78. The illumination system 74 includes the light source device 72, the optical element 32, and the optical element adjusting device 10. In the embodiment, the light source device 72 is, for example, a light bulb, a plurality of LED light sources, or a plurality of laser light sources for generating the beam L. The optical element adjusting device 10 and the optical element 32 fixed thereon can be disposed between the light source device 72 and the light valve 76. The optical element 32 is located on the transmission path of the beam L to converge the beam L. The beam L is transmitted to the light valve 76 after being converged. The light valve 76 is disposed on the transmission path of the beam L to form an image beam L'. The projection lens 78 is disposed on the transmission path of the image beam L' to project the image beam L' onto a screen to form an image frame on the screen.

Figure 10:
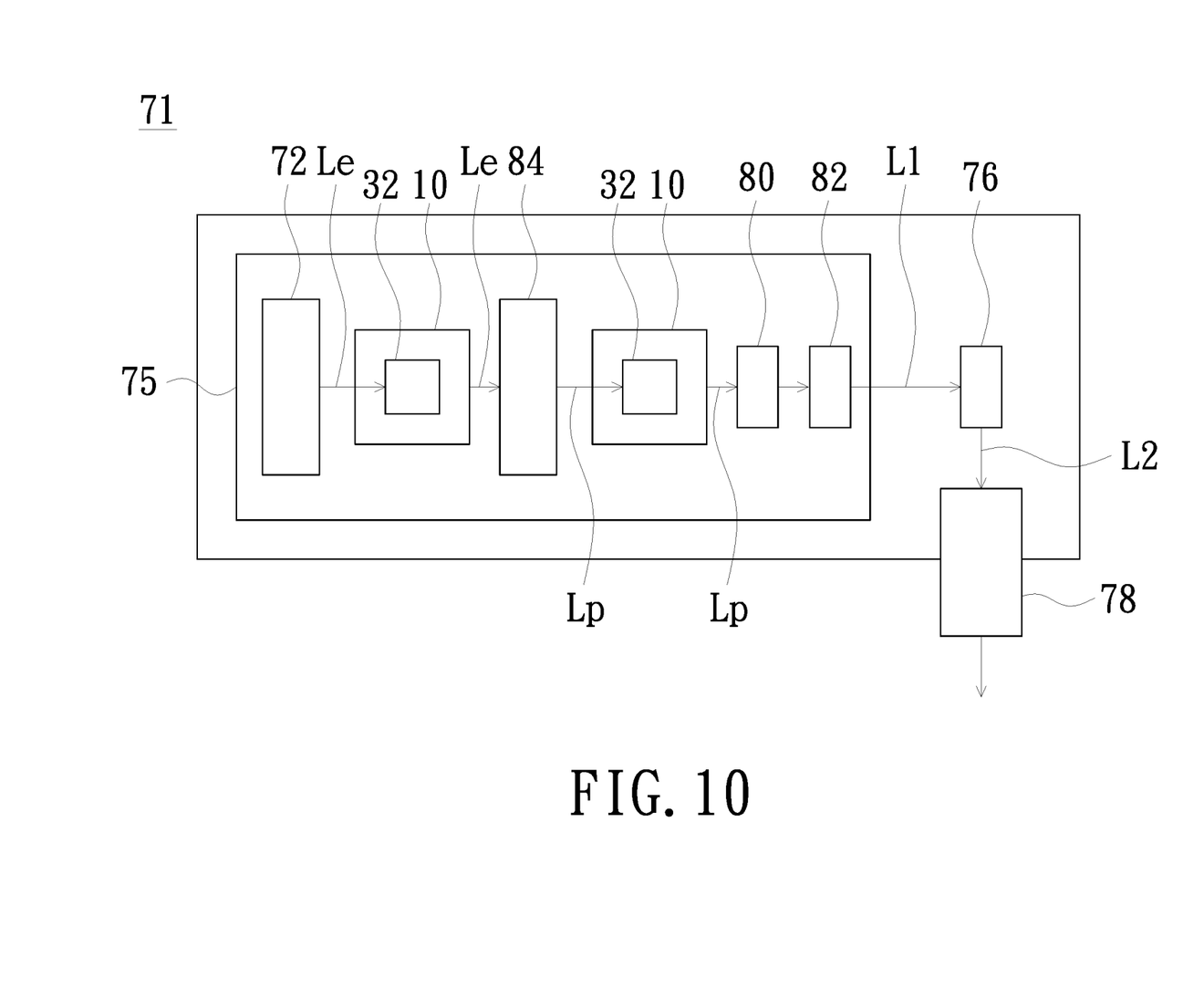
FIG. 10 is a schematic block diagram of an electronic device according to another embodiment of the invention.

FIG. 10 is a schematic block diagram of an electronic device according to another embodiment of the invention. Please refer to FIG. 10. The electronic device 71 is, for example, a projector. The electronic device 71 includes an illumination system 75, a light valve 76, and a projection lens 78. Specifically, the illumination system 75 may further include a filter element 80, a light homogenizing element 82, and a wavelength conversing element 84 in addition to the light source device 72, the optical element 32, and the optical element adjusting device 10 described above. In the embodiment, the light source device 72 is, for example, a laser light source for generating an exciting beam Le. The optical element adjusting device 10 and the optical element 32 fixed thereon can be disposed between the light source device 72 and the wavelength conversing element 84. The optical element 32 is located on the path of the exciting beam Le transmitted to the wavelength conversing element 84 to converge the exciting beam Le to the wavelength conversion element 84. The exciting beam Le forms a converted beam Lp by the wavelength conversing element 84.

Following the above description. The filter element 80 and the light homogenizing element 82 can be disposed on the transmission path of the converted beam Lp. The filter element 80 is configured to filter out a beam other than a specific wavelength range and allow the beam in the specific wavelength range to pass therethrough, thereby improving the color purity of the color light. In an embodiment, the filter element 80 is, for example, a filter wheel or other optical element having a color filter effect. The light homogenizing element 82 is, for example, a light integration rod, but is not limited thereto. The light homogenizing element 82 is, for example, a light integration rod, but is not limited thereto. The positions of the filter element 80 and the light homogenizing element 82 are not limited. The converted beam Lp from the wavelength conversing element 84 may pass through the filter element 80 and then pass through the light homogenizing element 82, or pass through the light homogenizing element 82 and then pass through the filter element 80. The optical element adjusting device 10 and the optical element 32 fixed thereon may be disposed between the wavelength conversing element 84 and the filter element 80, and the optical element 32 is located on the transmission path of the converted beam Lp; or the optical element adjusting device 10 and the optical element 32 fixed thereon may be disposed between the wavelength conversing element 84 and the light homogenizing element 82, and the optical elements 32 is located on the transmission path of the converted beam Lp, thereby adjusting the path of the beam inside the illumination system 75, so that the illumination system 75 is used for providing the illumination beam L1.

Further, the light valve 76 is disposed on the transmission path of the illumination beam L1 to form the image beam L2. The projection lens 78 is disposed on the transmission path of the image beam L2 to project the image beam L2 onto the screen to form an image frame on the screen. The light valve 76 can be a reflective light valve or a transmissive light valve. The reflective light valve can be a digital micro-mirror device (DMD) or a liquid crystal on silicon (LCOS) panel, and the transmissive light valve can be a transmissive liquid crystal panel, but is not limited thereto. The projection lens 78 includes, for example, a combination of one or more optical lenses having diopter, such as various combinations of non-planar lenses including biconcave lenses, biconvex lenses, concavo-convex lenses, convexo-concave lenses, plano-convex lenses, and plano-concave lenses. The invention does not limit the form and the type of the projection lens.

In the invention, by screwing the adjusting element in and out to drive the rolling element to roll, the position of the optical element can be easily finely adjusted, thereby having the advantages of improving adjusting convenience and reducing processing time. When the optical element has been assembled and fixed to the light engine housing of the projection device through the optical element adjusting device, since the adjusting tool, such as a screwdriver, for rotating the adjusting element takes up less space, the position of the optical element can be finely adjusted by reserving less adjusting space in the light engine housing. In addition, since the exposed adjusting end of the adjusting element is toward the top side of the light engine housing, the transmission of the beam is not affected when the adjusting tool rotates the adjusting element, and thus the position of the optical element can be adjusted according to the image brightness of the beam. On the other hand, since the optical element adjusting device uses the rolling of the rolling element to finely adjust the position of the optical element, different moving range is provided with different radius of curvature of the rolling elements, and thus, a high adjusting margin is provided.

The foregoing description of the preferred embodiment of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "The invention" or the like is not necessary limited the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims. Furthermore, the terms such as the first adjusting structure, the second adjusting structure, the first outer side surface, the second outer side surface, the first outer frame side, the second outer frame side, the first inner surface, second inner surface, the first adjusting part, the second adjusting part, the first sub-channel, the second sub-channel, the first direction, the second direction, the first frame part, the second frame part, the first butting end, the second butting end, the third butting end and the forth butting end are only used for distinguishing various elements and do not limit the number of the elements.

What is claimed is:

1. An optical element adjusting device for arranging an optical element, and the optical element adjusting device comprising an outer frame, an inner frame, a first adjusting structure and a second adjusting structure, wherein:
    the outer frame has a framed space;
    the inner frame is for framing the optical element, the inner frame is disposed in the framed space, and the inner frame comprises a first outer side surface and a second outer side surface opposite to each other;
    the first adjusting structure comprises a first adjusting part, the first adjusting part is connected to the first outer side surface of the inner frame, and at least a portion of the first adjusting part is movably disposed through the outer frame; and
    the second adjusting structure comprises a through channel formed in the outer frame, a second adjusting part, at least one rolling element and an adjusting element, the through channel comprises a first sub-channel and a second sub-channel communicated with each other, the second adjusting part is connected to the second outer side surface of the inner frame, at least a portion of the second adjusting part is movably disposed through the first sub-channel, at least a portion of the adjusting element is movably disposed through the second sub-channel, and the at least one rolling element is disposed in the through channel and between the second adjusting part and the adjusting element.

2. The optical element adjusting device according to claim 1, wherein the first adjusting structure further comprises a containing recess formed in the outer frame and an elastic element, the containing recess is opposite to the through channel, the elastic element is disposed in the containing recess, and an end of the first adjusting part disposed through the outer frame is inserted into the containing recess, so that the first adjusting part is disposed between the first outer side surface of the inner frame and the elastic element.

3. The optical element adjusting device according to claim 2, wherein the outer frame comprises a first outer frame side and a second outer frame side opposite to each other, the first outer frame side has a first inner surface, the second outer frame side has a second inner surface, the first inner surface of the first outer frame side and the first outer side surface of the inner frame are opposite to each other, the second inner surface of the second outer frame side and the second outer side surface of the inner frame are opposite to each other, the second outer frame side has a top surface, the top surface is non-parallel to the second inner surface, the containing recess is disposed in the first outer frame side, the through channel is disposed in the second outer frame side, the first sub-channel passes through the second inner surface, and the second sub-channel is communicated with the first sub-channel and passes through the top surface.

4. The optical element adjusting device according to claim 3, wherein the through channel is L-shaped, the first sub-channel transversely passes through the second inner surface of the second outer frame side, and the second sub-channel longitudinally passes through the top surface of the second outer frame side.

5. The optical element adjusting device according to claim 3, further comprising at least one fixing element, wherein the outer frame further comprises a top frame side connected to the first outer frame side and the second outer frame side, the top frame side is formed with at least one through hole, and the at least one fixing element is disposed through the at least one opening and the inner frame to fix the inner frame to the framed space.

6. The optical element adjusting device according to claim 2, wherein the first adjusting structure further comprises a blocking part disposed at the end of the first adjusting part inserted into the containing recess and the blocking part is abutted against the elastic element, and a cross-sectional dimension of the blocking part is larger than a cross-sectional dimension of the first adjusting part.

7. The optical element adjusting device according to claim 1, wherein the second adjusting part has a connecting end and a contacting end opposite to each other, the connecting end is fixed to the second outer side surface, the contacting end contacts the at least one rolling element, and an end surface of the contacting end is selected from one of a flat surface, a convex cambered surface, a concave cambered surface, a concave angular surface and a sharp end.

8. The optical element adjusting device according to claim 1, wherein the adjusting element has an adjusting end and a pushing end opposite to each other, the adjusting end is exposed from the second sub-channel, the pushing end contacts the at least one rolling element, and an end surface of the pushing end is selected from one of a flat surface, a convex cambered surface, a concave cambered surface, a concave angular surface and a sharp end.

9. The optical element adjusting device according to claim 1, wherein a cross-sectional dimension of the first sub-channel is different from a cross-sectional dimension of the second sub-channel.

10. The optical element adjusting device according to claim 1, wherein a cross-sectional dimension of the second adjusting part is different from a cross-sectional dimension of the adjusting element.

11. The optical element adjusting device according to claim 1, wherein a number of the at least one rolling element is plural, and the plurality of rolling elements have the same or different sizes.

12. The optical element adjusting device according to claim 1, wherein the adjusting element is an adjusting screw, the adjusting element is rotated to work in the second sub-channel and to push the at least one rolling element, and the at least one rolling element pushes the second adjusting part to cause the second adjusting part to be moved in the first sub-channel.

13. The optical element adjusting device according to claim 1, wherein the optical element comprises a condenser lens.

14. The optical element adjusting device according to claim 2, wherein the elastic element comprises a spring.

15. The optical element adjusting device according to claim 2, wherein the outer frame comprises a first frame part and a second frame part, the first frame part and the second frame part are adapted to be butted together to construct the framed space, the first frame part has a first butting end and a second butting end, the second frame part has a third butting end and a fourth butting end, at least one of the first butting end and the third butting end has a bent concave part, and the first butting end and the third butting end are butted to cause the bent concave part to be constructed as the through channel.

16. The optical element adjusting device according to claim 15, wherein at least one of the second butting end and the fourth butting end has a containing concave part, and the second butting end and the fourth butting end are butted to cause the containing concave part to be constructed as the containing recess.

17. An electronic device having a light source device for generating a beam, and the electronic device comprising at least one optical element and at least one optical element adjusting device, wherein:
the at least one optical element adjusting device is for respectively disposing the at least one optical element, the at least one optical element is disposed on a transmission path of the beam, and the optical element adjusting device comprises an outer frame, an inner frame, a first adjusting structure and a second adjusting structure, wherein:
the outer frame has a framed space;
the inner frame is framing the optical element, the inner frame is disposed in the framed space, and the inner frame comprises a first outer side surface and a second outer side surface opposite to each other;
the first adjusting structure comprises a first adjusting part, the first adjusting part is connected to the first outer side surface of the inner frame, and at least a portion of the first adjusting part is movably disposed through the outer frame; and
the second adjusting structure comprises a through channel formed in the outer frame, a second adjusting part, at least one rolling element and an adjusting element, the through channel comprises a first sub-channel and a second sub-channel connected to each other, the second adjusting part is connected to the second outer side surface of the inner frame, at least a portion of the second adjusting part is movably disposed through the first sub-channel, at least a portion of the adjusting element is movably disposed through the second sub-channel, and the at least one rolling element is disposed in the through channel and between the second adjusting part and the adjusting element.

* * * * *